(No Model.)
B. FITZPATRICK & H. C. BOATRIGHT.
BALE PRESS.
No. 494,920. Patented Apr. 4, 1893.
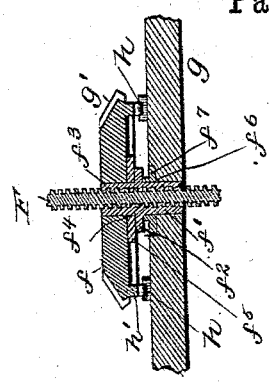
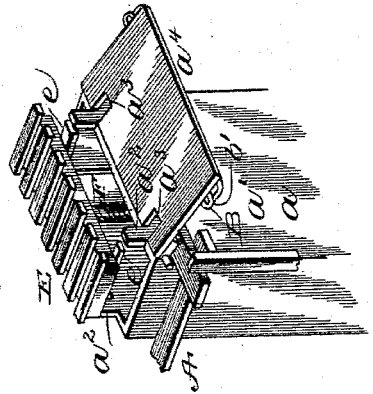
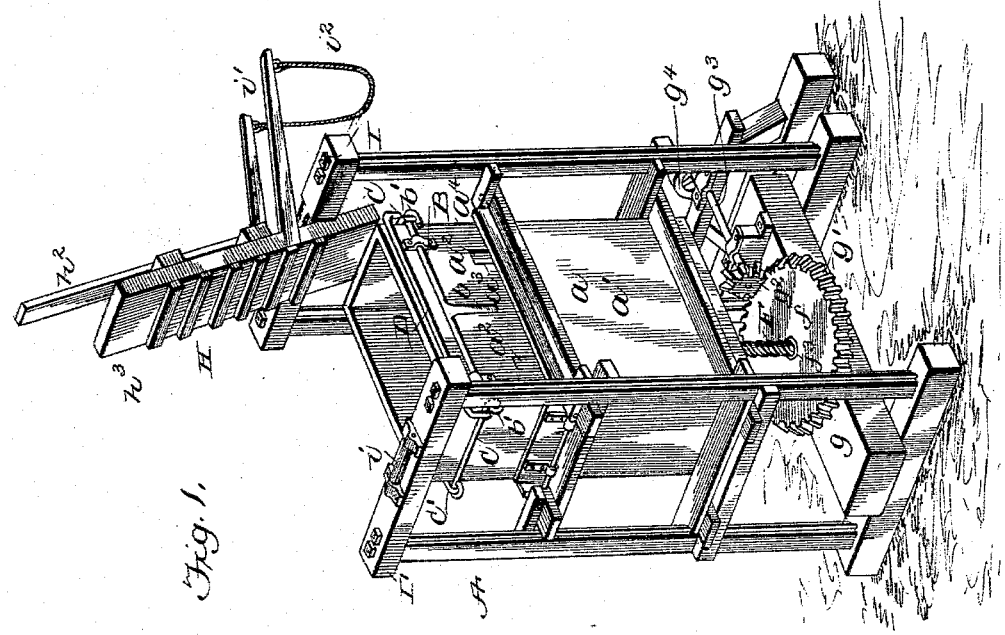
Witnesses
John Danivie
Wm. S. Hodges
Inventors
Benjamin Fitzpatrick
Henry C. Boatright
By Theodore J. Pickett
Attorney

UNITED STATES PATENT OFFICE.

BENJAMIN FITZPATRICK AND HENRY CLAY BOATRIGHT, OF WETUMPKA, ALABAMA.

BALE-PRESS.

SPECIFICATION forming part of Letters Patent No. 494,920, dated April 4, 1893.

Application filed May 28, 1892. Serial No. 434,730. (No model.)

*To all whom it may concern:*

Be it known that we, BENJAMIN FITZPATRICK and HENRY CLAY BOATRIGHT, citizens of the United States, residing at Wetumpka, in the county of Elmore and State of Alabama, have invented certain new and useful Improvements in Bale-Presses; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention contemplates certain new and useful improvements in bale-presses, and has for its object the production of a new and improved cotton bale-press possessing advantages in point of simplicity, durability and general efficiency, whereby a maximum amount of pressure can be secured and the baling operation rapidly and easily accomplished.

The invention comprises the detail construction, combination and arrangement of parts, substantially as hereinafter fully set forth, and particularly pointed out in the claims.

In the accompanying drawings:—Figure 1 is a view in perspective of our improved bale-press. Fig. 2 is a similar view showing the follower elevated and a portion of the inclosing box. Fig. 3 shows the main operating wheel and its adjuncts. Fig. 4 is a vertical sectional view through said wheel, on the line $x-x$, Fig. 1.

Referring to the drawings, A designates the frame-work of ordinary construction, which is composed of upright timbers and connecting bars and rods. Within this frame is located box $a$ which is rigidly held in position. The sides of this box $a$ at the upper half of the latter are pivoted so that they can be lowered or readily turned outward. The opposite longitudinal sides $a'$ of box $a$ have upwardly extending projections $a^2$ which, when the pivoted portions of said sides are elevated into a perpendicular position, will fill or occupy corresponding openings $a^3$ in said pivoted portions. To one of these pivoted portions $a^4$ of side $a'$ is loosely secured a clamping bar B, having a central outwardly projecting handle $b$. The ends of this bar are thickened or bent back upon themselves as shown at $b'$, and said ends are designed to engage the hooked ends of transverse bars C extending across the narrowed ends or sides of box $a$, the same being pivotally secured at their other ends to rods $C'$ attached to the pivoted portion of the side of box $a$ opposite the pivoted portion $a^4$. The rods C are held in place by the hooked ends of a rod D attached to the upper end of the pivoted portion $a^4$. By turning bar B so that its thickened ends and handles $b$ will occupy a horizontal position the end rods C will be firmly bound or held in place, thus locking the pivoted portions of the bale-box.

E is the follower located within and corresponding to the shape of box $a$. From the under side of this follower project lateral arms $e$, which bear against the sides $a'$ of box $a$, and also against the projections $a^2$ when said follower is raised to its fullest extent, said lateral arms preventing the turning of said follower. The advantages of these projections is that the follower can be raised above the lower portion of the box $a$ and at the same time will be prevented from turning when moved to a point above said lower portion. The hinged sides of the box being lowered access to the bale is readily and easily had. This follower is loosely secured on the upper end of a double threaded screw-rod F, which is passed through a central opening in the main operating wheel $f$ located at the bottom of and within the framework A. That portion of the screw-rod F extended beneath wheel $f$ fits within an interiorly threaded sleeve $f'$. This sleeve is cylindrical in its lower portion, and about its center is provided with a flange or collar $f^2$, and its upper end is made square or octagonal as shown at $f^3$. This squared or octagonal portion fits within a corresponding opening $f^4$ of a plate $f^5$ rigidly secured to the under side of wheel $f$, while the cylindrical portion of sleeve $f'$ fits within a corresponding circular opening $f^6$ of a plate $f^7$ rigidly attached to the lower cross-beams $g$ of frame-work A. The wheel $f$ is provided around its edge with teeth $g'$ with which is designed to engage a pinion $g^2$ on a main driving shaft $g^3$ mounted in suitable bearings attached to the frame-work A, and having a wheel or pulley $g^4$ at its outer end for the driving belt, not shown. The wheel $f$ is supported at its under side at a point directly beneath the pinion $g^2$ by a roller $h$ mounted in a suitable bearing and in contact with a circular band $h'$ on the under side of said wheel. This roller relieves the pressure on wheel $f$ caused by the intermeshing of pinion $g^2$ with the teeth of said wheel.

H is the head-block which is composed of upper and lower members $h^2$, $h^3$, the latter having the ordinary cross-bars $h^4$. The members $h^2$, $h^3$ of this head-block are designed to hug one of the cross-bars I of framework A. This cross-bar is rounded or curved at about the center of its lower inner edge, and also at its upper outer edge so as to permit the head-block to be turned into a perpendicular position. When the head-block is lowered and moved to one side the member $h^3$ will pass beneath the upper cross-bar I' of framework A, while its upper member $h^2$ will come in contact with and rest upon a roller $i$ journaled on the upper portion of cross-bar I'. Thus the head-block is securely held ready to receive the pressure of the bale while being acted upon by the follower.

From the head-block H project two vertical arms $i'$, to the outer ends of which are connected the ends of a cord or strap $i^2$ by means of which the head-block can be turned on the cross-bar I into a perpendicular position after said head-block has been moved to one side so that the free ends of its upper and lower members will be clear of the cross-bar I'. Thus it will be seen that the head block is readily and easily lowered into or elevated out of position, and that when so lowered and moved to one side it is firmly and rigidly held in place. All the parts are firmly and securely held together and all loosening or disconnection of the said parts when under strain is successfully avoided.

The advantages of our invention are apparent to those skilled in the art to which it appertains.

From what has been said the operation is readily understood. Motion being imparted through the driving shaft to the lower operating wheel the revolution of the screw-rod is secured, and this will effect the elevation or raising of the follower in the bale-box. When the latter reaches the upper limit of its movement beyond the lower pivotal ends of the hinge or pivoted sections of the box it is still held in proper position by the lateral arms.

We claim as our invention—

1. The herein-described improved bale press, comprising the frame-work having upper cross-bars, one of which is provided with central curved or partially rounded portions, and a head-block having upper and lower members designed to overlap said cross-bars and free to turn on said curved portions and thus be elevated out of the way, substantially as set forth.

2. The herein-described improved bale-press, comprising the frame-work having upper cross-bars, one of which is provided with central curved or partially rounded portions, the frictional roll secured to the other one of said cross-bars, and the head block having upper and lower members designed to engage said cross-bars, said upper member being supported by said frictional roll, substantially as set forth.

In testimony whereof we affix our signatures in presence of two witnesses.

BENJAMIN FITZPATRICK.
HENRY CLAY BOATRIGHT.

Witnesses:
E. N. PENICK,
J. CALLAWAY.